United States Patent
Feng et al.

(10) Patent No.: US 12,050,459 B2
(45) Date of Patent: Jul. 30, 2024

(54) ANOMALY DETECTION METHOD AND APPARATUS FOR DYNAMIC CONTROL SYSTEM, AND COMPUTER-READABLE MEDIUM

(71) Applicant: Siemens Aktiengesellschaft, Munich (DE)

(72) Inventors: Cheng Feng, Hangzhou (CN); Fan Wang, Beijing (CN); Cong Chao Li, Suzhou (CN); Jia Wen Chen, Suzhou (CN); Peng Wei Tian, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/262,630

(22) PCT Filed: Dec. 27, 2021

(86) PCT No.: PCT/CN2021/141706
§ 371 (c)(1),
(2) Date: Jul. 24, 2023

(87) PCT Pub. No.: WO2022/161069
PCT Pub. Date: Aug. 4, 2022

(65) Prior Publication Data
US 2024/0045411 A1 Feb. 8, 2024

(30) Foreign Application Priority Data
Jan. 27, 2021 (CN) .......................... 202110112274.X (51) Int. Cl.
*G05B 23/02* (2006.01)
(52) U.S. Cl.
CPC ....... *G05B 23/0221* (2013.01); *G05B 23/024* (2013.01)

(58) Field of Classification Search
CPC .......................... G05B 23/0221; G05B 23/024
See application file for complete search history.

(56) References Cited

U.S. PATENT DOCUMENTS

| 5,586,221 A | 12/1996 | Isik | 395/22 |
| 8,606,554 B2* | 12/2013 | Zimmermann | G05B 23/0243 700/277 |
| 2021/0097438 A1* | 4/2021 | Matsumoto | G06N 7/01 |

FOREIGN PATENT DOCUMENTS

| CN | 104 156 422 | 11/2014 | ............. G06F 17/30 |
| CN | 111 666 982 | 9/2020 | ............... G06K 9/62 |

(Continued)

OTHER PUBLICATIONS

Huang et al., "Using recurrent neural networks toward black-box system anomaly prediction", Oct. 18, 2016, IEEE/ACM 24th International Symposium on Quality of Service (IWQoS), pp. 1-10 (Year: 2016).*

(Continued)

*Primary Examiner* — Mischita L Henson
(74) *Attorney, Agent, or Firm* — Slayden Grubert Beard PLLC (57) ABSTRACT

Various embodiments of the teachings herein include anomaly detection methods for a dynamic control system. An example method includes: using a g network to initialize a hidden state distribution of the system; receiving a measurement value of a sensor and a state value of a trigger at a current point of time; receiving a sampling point into an f network to perform a prediction to obtain a second sampling point; using an h network to map the second sampling point into a sensor measurement value space to perform a prediction to obtain a probability distribution of a measurement value of the sensor in the dynamic control system at the current point of time; and determining whether an anomaly exists in the dynamic control system by comparing the (Continued)

measurement value obtained from real-time monitoring and the probability distribution obtained from a prediction.

9 Claims, 4 Drawing Sheets

(56) References Cited

FOREIGN PATENT DOCUMENTS

| EP | 1914638 A1 | * | 4/2008 | ........... G05B 23/021 |
| WO | WO-2007067471 A1 | * | 6/2007 | ......... G05B 19/4065 |

OTHER PUBLICATIONS

Search Report for International Application No. PCT/CN2021/141706, 9 pages, Mar. 9, 2022.
Hochreiter, Sepp et al., "Long Short-Term Memory," Neural Computation, 9(8), 32 pages, Dec. 1997.
Wan, Eric A. et al, "The Unscented Kalman Filter for Nonlinear Estimation," Proceedings of the IEEE 2000 Adaptive Systems for Signal Processing, Communications, and Control Symposium, 6 pages, Oct. 4, 2000.
Manevitz, Larry M. et al., "One-Class SVMs for Document Classification," Journal of Machine Learning Research, vol. 2, pp. 139-154, Dec. 2001.
Van der Merwe, Rudolph, "Sigma-Point Kalman Filters for Probabilistic Inference in Dynamic State-Space Models," Ph.D. Dissertation, Oregon Health & Science University, 397 pages, Apr. 2004.
Hinton, Geoffrey E. et al., "A Fast Learning Algorithm for Deep Belief Nets," Neural Computation, 18(7), pp. 1527-1554, Jul. 1, 2006.
Yuan, Chao et al., "Bayesian Sensor Estimation for Machine Condition Monitoring," Siemens Corporate Research Inc., 2007 IEEE International Conference on Acoustics, Speech and Signal Processing—ICASSP'07, vol. 2, pp. 517-520, Apr. 15, 2007.
Yuan, Chao et al., "Robust Sensor Estimation Using Temporal Information," 2008 IEEE International Conference on Acoustics, Speech and Signal Processing, pp. 2077-2080, Mar. 31, 2008.
Liu, Fei Tony et al., "Isolation Forest," 2008 Eighth IEEE International Conference on Data Mining, 10 pages, Dec. 15, 2008.
Kingma, Diederik et al., "Auto-Encoding Variational Bayes," arXiv preprint, 14 pages, Dec. 20, 2013.
Kingma, Diederik et al., "Adam: A Method for Stochastic Optimization," arXiv preprint, 15 pages, Dec. 22, 2014.
Xie, Xin et al., "Multivariate Abnormal Detection for Industrial Control Systems Using 1D CNN and GRU," IEEE Access, vol. 8, pp. 88348-88359, May 7, 2020.
Feng, Cheng et al., "Time Series Anomaly Detection for Cyber-Physical Systems via Neural System Identification and Bayesian Filtering," arxiv.org, XP091124529; DOI: 10.1145/3447548.3467137, 10 pages, Jan. 7, 2022.
Extended European Search Report, Application No. 21922658.6, 10 pages, Mar. 15, 2024.

* cited by examiner

ANOMALY DETECTION METHOD AND APPARATUS FOR DYNAMIC CONTROL SYSTEM, AND COMPUTER-READABLE MEDIUM

CROSS-REFERENCE TO RELATED APPLICATIONS

This application is a U.S. National Stage Application of International Application No. PCT/CN2021/141706 filed Dec. 27, 2021, which designates the United States of America, and claims priority to CN Application No. 202110112274.X filed Jan. 27, 2021, the contents of which are hereby incorporated by reference in their entirety.

TECHNICAL FIELD

The present disclosure relates to anomaly detections. Various embodiments of the teachings herein include anomaly detection methods and/or apparatus for a dynamic control system and a computer-readable medium.

BACKGROUND

Active state monitoring of a dynamic control system is vital to the safety and reliability of various industries (for example, discrete manufacturing, power generation, building asset management, and process industries). To detect operation faults in advance in predictive maintenance, an anomaly detection system is usually deployed to monitor dynamic behaviors of a control system, including dynamic changes of the measurement values of a sensor and the state values of a trigger over time. However, it is still very difficult to build an effective anomaly detection model having a high true positive rate and a low false positive rate for a dynamic control system in practice. The reasons are:
1. The fault data volume is usually small and the anomaly detection model must be able to detect an unknown fault.
2. For a control system having highly nonlinear dynamic behaviors, the anomaly detection model must be able to accurately capture complex dynamic behaviors of the system.
3. An anomaly must be accurately detected when the sensor noise level and the model error at a random point of time are unknown.

Currently, anomaly detection methods for a dynamic control system include: residual-based anomaly detection methods, density-based anomaly detection methods, one-class classification-based anomaly detection methods and rule-based anomaly detection methods.

Residual-based anomaly detection methods depend on a neural network-based regressive prediction model (see *Long Short-Term Memory* published by Hochreiter, Sepp & Jürgen Schmidhuber on page 1735 to page 1780 of the journal of *Neural Computation* in 1977) or a reconstruction model of an auto-encoder (see *Fast Learning Algorithm for Deep Belief Nets* published by Hinton, Geoffrey E, Simon Osindero & Yee-Whye Teh on page 1527 to page 1554 of the journal *Neural Computation* in 2006, and *Auto-Encoding Variational Bayes* published by Kingma, Diederik P & Max Welling on the preprint platform arXiv in 2013) so that a measurement value of a sensor is compressed to obtain low-dimensionality characteristics and reconstruct a measurement value. Then a predicted or reconstructed measurement value is compared with the measurement value obtained from real-time monitoring to generate a residual. If the residual exceeds a preset threshold, it is considered that an anomaly is detected. Since the sensor noise level and the prediction error or reconstruction error at each point of time are unknown in practice, it is very difficult to define a strict threshold between a normal measurement value and an abnormal measurement value of the sensor. The performance of a residual-based anomaly detection method will usually degrade when a measurement value of the sensor is interfered with by a high noise level or the prediction or reconstruction error of the model is unsteady.

For density-based anomaly detection methods, a model is built for the probability distribution of a measurement value of the sensor at each point of time. When the likelihood value of a measurement value monitored in real time is smaller than the preset threshold, it is considered that an anomaly is detected. Density-based anomaly detection methods include the Kalman filter algorithm (see *Kalman Filter* published by C. K. Chui & G. Chen on Springer in 2017, and *Unscented Kalman Filter for Nonlinear Estimation* published by Wan, Eric A and Rudolph Van Der Merwe on *Summary of IEEE Workshop on Signal Processing, Communication and Adaptive Control System* (numbered 00EX373) in 2000) and the Bayesian estimation algorithm (see *Bayes Sensor Estimation for Machine State Monitoring* published by Chao Yuan & Claus Neubauer on page 517 to page 520 of the journal of *IEEE International Conference on Acoustics, Speech and Signal Processing* in 2007, and *Robust Sensor Estimation Using Time Information* published by Chao Yuan and Claus Neubauer on page 2077 to page 2080 of the journal of *IEEE International Conference on Acoustics, Speech and Signal Processing* in 2008). Although density-based anomaly detection methods are generally more robust for sensor noise than residual-based anomaly detection methods, density-based anomaly detection methods still have some limitations which restrict the practical application. For example, it is usually necessary to build a mathematical model of a physical dynamic process through system identification before the Kalman filter algorithm is applied, but system identification is very difficult in practice. In addition, high prior knowledge is usually required for many density-based anomaly detection methods in a physical dynamic process and/or the modeling of the distribution of measurement values of a sensor. When the physical dynamic process is highly nonlinear, the performance of these methods may degrade.

One-class classification-based anomaly detection methods, for example, the one-class support vector machine (SVM) (see *One-Class Support Vector Machine for Document Classification* published by Manevitz, Larry M & Malik Yousef on page 139 to page 154 of the journal of *Machine Learning* in 2001) and the isolation forest (see *Isolation Forest* published by Liu, Fei Tony, Kai Ming Ting & Zhi-Hua Zhou at the 8th IEEE International Conference on Data Mining in 2008) can be naturally applied to anomaly detections of a dynamic control system and can provide high explainability. Because of the curse of dimensionality and high nonlinearity of dynamic behaviors of the system, these methods are not applicable to current dynamic control systems.

In rule-based anomaly detection methods, the state conditions, which must be maintained for a system, are obtained from prior knowledge. Any physical process value monitored in real time and destroying rules is classified into an anomaly. Typically, the rules are defined by field experts at the system design stage, and it is time-consuming and labor-consuming to manually process the rules. In addition, when the rules are related to subsystems, many hidden rules will exist, and it is very difficult for human beings to follow the hidden rules. Therefore, rule-based anomaly detection methods are usually subject to the fact that it is difficult to find enough rules.

SUMMARY

Various embodiments of teachings of the present disclosure include anomaly detection methods and/or apparatus for a dynamic control system, and a computer-readable medium. First, the structure of a specially designed neural network is used for system identification of a dynamic control system, and the system identification process is automatically completed by training the neural network. By using a neural network, the generality of system identifications can significantly be improved, highly nonlinear dynamic behaviors of the dynamic control system can be obtained, and the common problem that a model having an average ability of expression may cause dimensionality disasters is overcome. Then, in consideration of the noise from the sensor and the uncertainty of the model error, the Bayes filter method is used and an anomaly is detected according to the likelihood of a measurement value of the sensor monitored in real time.

As an example, an anomaly detection method for a dynamic control system is provided, and the method may be implemented by a computer program. The method may comprise: using a g network to initialize a hidden state distribution of a dynamic control system; receiving a measurement value of a sensor and a state value of a trigger obtained from real-time monitoring in the dynamic control system at the current point of time t; inputting at least one first sampling point into an f network to perform a prediction to obtain at least one second sampling point, wherein the at least one first sampling point is used to represent a hidden state distribution of the dynamic control system at a neighboring point of time t−1 before the current point of time t, and the at least one second sampling point is used to represent a prior hidden state distribution of the dynamic control system at the current point of time t; using an h network to map the at least one second sampling point into a sensor measurement value space to perform a prediction to obtain a probability distribution of a measurement value of the sensor in the dynamic control system at the current point of time t; determining whether an anomaly exists in the dynamic control system by comparing the measurement value obtained from real-time monitoring and the probability distribution obtained from a prediction. The g network, the f network and the h network are sub-networks in a neural network used to represent the dynamic distribution of the dynamic control system, the g network is a feed-forward network and encodes a measurement value of a sensor into a low-dimensionality hidden state vector; the f network encodes a measurement value of a sensor and a state value of a trigger in a sliding window into vectors and utilizes the hidden state vector obtained from the encoding of the g network at the current point of time to predict a hidden state vector at the next point of time; the h network is a feed-forward network and decodes the hidden state vector obtained from the prediction at the next point of time into a measurement value of a sensor and decodes the low-dimensionality hidden state vector at the current point of time into a measurement value of a sensor; the neural network is obtained by using measurement values of a sensor obtained in normal operating conditions of the dynamic control system to perform training.

As another example, an anomaly detection apparatus for a dynamic control system comprises:
an initialization module, configured to use a g network to initialize a hidden state distribution of a dynamic control system;
a data acquisition module, configured to receive a measurement value of a sensor and a state value of a trigger obtained from real-time monitoring in the dynamic control system at the current point of time t;
a prediction module, configured to input at least one first sampling point into an f network to perform a prediction to obtain at least one second sampling point, wherein the at least one first sampling point is used to represent a hidden state distribution of the dynamic control system at a neighboring point of time t−1 before the current point of time t, the at least one second sampling point is used to represent a prior hidden state distribution of the dynamic control system at the current point of time t, and use an h network to map the at least one second sampling point into a sensor measurement value space to perform a prediction to obtain a probability distribution of a measurement value of the sensor in the dynamic control system at the current point of time t;
an anomaly determination module, configured to determine whether an anomaly exists in the dynamic control system by comparing the measurement value obtained from real-time monitoring and the probability distribution obtained from a prediction.

In some embodiments, the g network, the f network and the h network are sub-networks in a neural network used to represent the dynamic distribution of the dynamic control system, the g network is a feed-forward network and encodes a measurement value of a sensor into a low-dimensionality hidden state vector; the f network encodes a measurement value of a sensor and a state value of a trigger in a sliding window into vectors and utilizes the hidden state vector obtained from the encoding of the g network at the current point of time to predict a hidden state vector at the next point of time; the h network is a feed-forward network and decodes the hidden state vector obtained from the prediction at the next point of time into a measurement value of a sensor and decodes the low-dimensionality hidden state vector at the current point of time into a measurement value of a sensor; the neural network is obtained by using measurement values of a sensor obtained in normal operating conditions of the dynamic control system to perform training.

As another example, an anomaly detection apparatus for a dynamic control system comprises at least a memory, configured to store computer-readable codes, and at least a processor, configured to cause the computer-readable codes to perform one or more of the methods described herein.

As another example, a computer-readable medium stores computer-readable instructions, and a processor performs the steps of one or more of the methods described herein when the computer-readable instructions are executed by the processor.

In some embodiments, the posterior hidden state distribution of the dynamic control system at the current point of time t may be updated to obtain the first sampling point at a neighboring point of time t+1 after the current point of time t. Thus, the uncertainty of the hidden state of the system is tracked in real time and the reliability of anomaly monitoring is increased.

In some embodiments, the loss function adopted for training the neural network minimizes the sum of the reconstruction error and the prediction error of measurement values of a sensor used for training at different points of time. The end-to-end training method makes it very easy to implement the neural network in practical applications.

In some embodiments, the at least one first sampling point and the at least one second sampling point are both sigma sampling points. In this way, the probability distribution is highly efficiently expressed by use of a minimum number of sampling points and the efficiency of the method is greatly improved.

DESCRIPTION OF REFERENCE NUMERALS IN THE DRAWINGS

| 10: Neural network | 1: Detection result by using the anomaly detection method provided in embodiments of the present invention | 2: Detection result by using the isolation forest method |
|---|---|---|
| 3: Detection result by using the Seq2SeqLSTM method | | 4: Detection result by using a dilated convolutional neural network |
| 5: Detection result by using a sparse auto-encoder | | 6: Detection result by using a variational auto-encoder |
| 7: Detection result by using an LSTM auto-encoder | | 8: Detection result by using the Bayes estimation algorithm |
| 30: Anomaly detection apparatus provided in embodiments of the present invention | | 301: Memory |
| 302: Processor | 303: Communication module | 31: Anomaly detection program |
| 311-315: Software program modules in the anomaly detection program 31 | | |
| 400: Anomaly detection method provided in embodiments of the present invention | | S401-S406: Steps of the method 400 |

DETAILED DESCRIPTION

Now, the subject matter described in this document is discussed with reference to exemplary embodiments. It should be understood that the discussions about these embodiments are only intended to enable those skilled in the art to have a better understanding in order to realize the subject matter described in this document, but are not intended to restrict the scope of protection, applicability, or examples described in the claims. Changes may be made to the functions and arrangements of the discussed elements, without departing from the scope of protection of the embodiments of the present disclosure. Various processes or components may be omitted, replaced, or added in different examples, as required. For example, the described method may be executed in a sequence different from what is described, and steps may be added, omitted or combined. In addition, the features described in relation to some examples may also be combined in other examples.

As used in this document, the term "comprise" and its variants are open terms and mean "include but are not limited to." The term "on the basis of" means "at least partially on the basis of." The terms "an embodiment" and "one embodiment" mean "at least one embodiment." The term "another embodiment" means "at least one other embodiment." The terms "first" and "second" may refer to different or identical objects. Other definitions, explicit or implicit, may be included below. Unless otherwise specified in the context, the definition of a term is consistent throughout the description.

Some related concepts are explained here to make the solution provided by embodiments of the present invention more understandable. It should be noted that the explanations should not be considered as defining the scope of protection of the claims of the present disclosure.

1. Dynamic Control System

Control systems are classified into static control systems and dynamic control systems. The differences between a static control system and a dynamic control system are as follows:

1) Changes are Different

The state variable of a dynamic control system changes significantly with time and the state variable is a function of time. The state variable of a static control system changes little with time and it is difficult to observe and measure a change of the state variable.

2) Parameter Associations are Different

A dynamic control system consists of various variables or parameters and these variables are associated with each other and are constantly dynamic. The output of a static control system at any point of time is only related to the input at the point of time, but has nothing to do with the input before or after the point of time.

3) The Final States are Different

The final state of a dynamic control system may be an equilibrium state or may be a non-equilibrium state. The final state of a static control system is an equilibrium state.

In addition, a dynamic control system may further have highly nonlinear dynamic behaviors and the feature that the noise level of a sensor and the model error are unknown. These are the reasons why the above-mentioned prior anomaly detections are not applicable to a dynamic control system.

2. System Identification

System identification is a process of determining a mathematic model describing system behaviors according to the input and output time functions of the system. The purpose of building a mathematic model through system identification is to estimate important parameters representing system behaviors to build a model which can simulate real system behaviors.

3. Time Series

Time series are a series of ordered data. Usually, they are data sampled at equal intervals. If they are not sampled at equal intervals, the time scale of each data point will be marked.

The embodiments of the present invention will be described in detail below in combination with the drawings.

Figure 1:
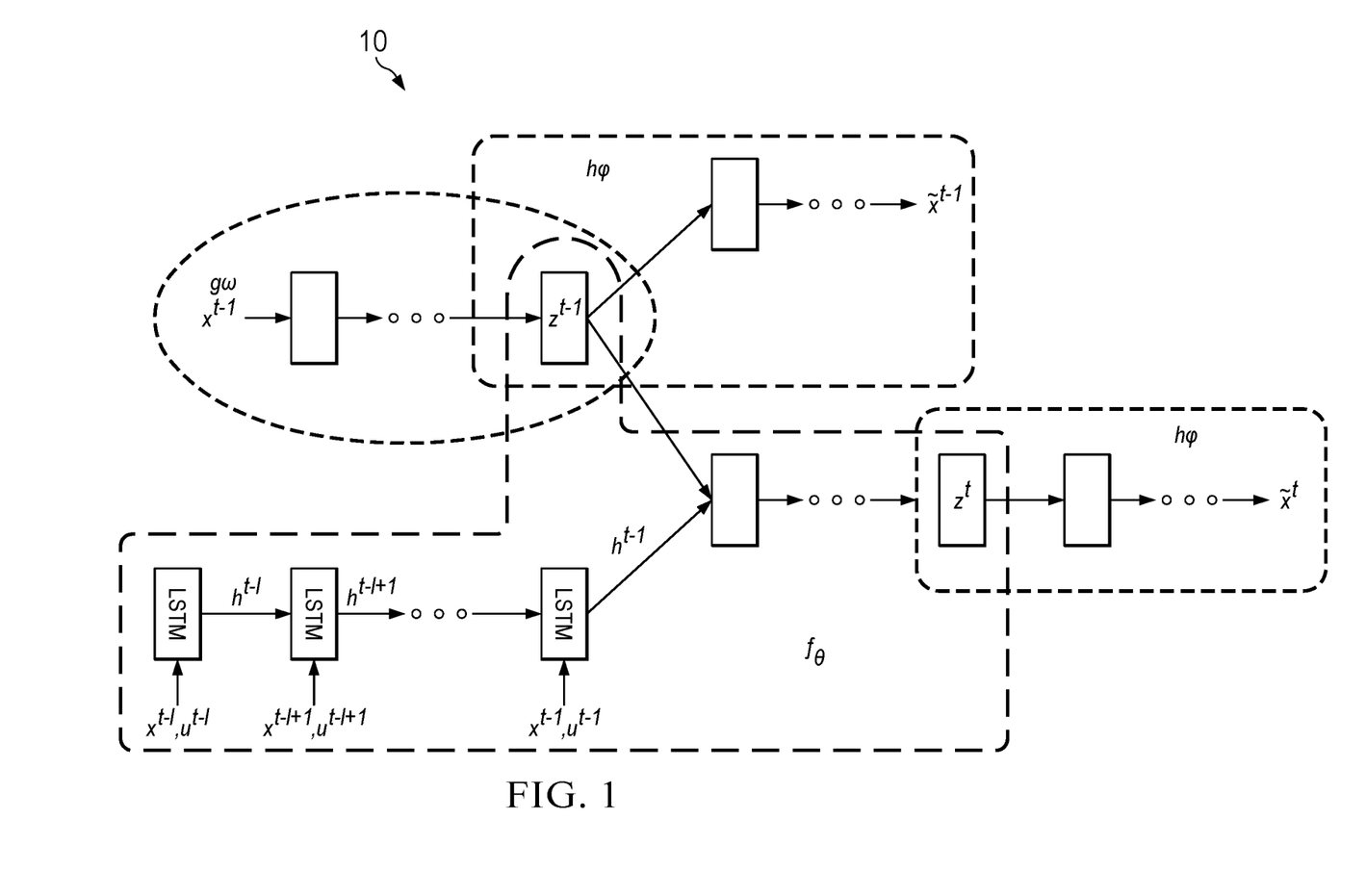
FIG. 1 shows the structure of an example neural network for system identification in some embodiments of the teachings of the present disclosure.
Figure 2:
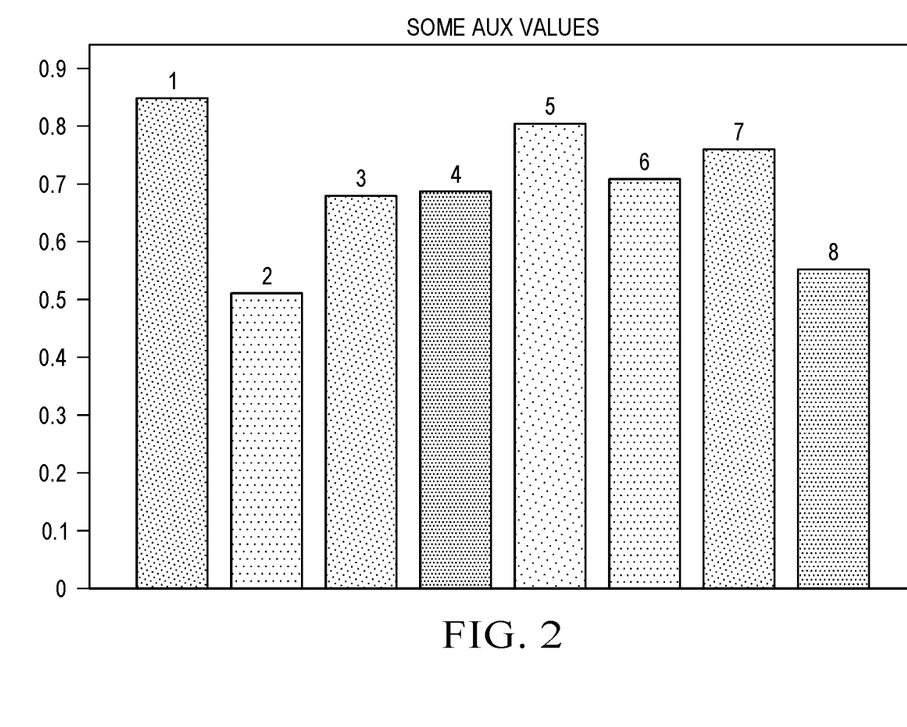
FIG. 2 shows a comparison between the anomaly detection effects of the anomaly detection method adopted in various embodiments of the teachings of the present disclosure and prior anomaly detection methods.

First, the neural network used for system identification of the dynamic control system and the process of anomaly detection by using the Bayes filter method in the embodiments of the present invention are described in combination with FIG. 1 and FIG. 2.

1. System Identification

FIG. 1 shows the structure of an example neural network 10 for system identification in various embodiments of the present disclosure. Without loss of generality, it is assumed that the dynamic control system comprises some sensors and some triggers. Let $x^t$ be measurement values of the sensors at the point of time t and let $u^t$ be state values of the triggers at the point of time t. Here, the following neural network structure is proposed to obtain dynamic changes of time series of the dynamic control system.

The neural network 10 here may comprise three sub-networks, called g network, f network and h network, respectively.

The g network, denoted by $g_\omega$, is a feed-forward network, and uses the measurement values $x^{t-1}$ of the sensors at the point of time t−1 as inputs and encodes the measurement values of the sensors into low-dimensionality state vectors $z^{t-1}$.

In the f network, denoted by $f_\theta$, the measurement values of the sensors and the state values of the triggers in a sliding window with a length of l are used as inputs and are encoded into hidden vector $h^{t-1}$ by using a long short-term memory (LSTM) neural network. Further, with $h^{t-1}$ as the context of the learned time series, the f network uses the hidden state vectors $z^{t-1}$ as inputs and then utilizes the feed-forward network to predict the hidden state vectors $z^t$ at the next point of time.

The h network, denoted by $h_\varphi$, is a feed-forward network and uses the hidden state vectors as inputs and decodes the hidden state vectors into corresponding measurement values of the sensors. It should be noted that the two h networks in FIG. 1 may share the same weight.

In some embodiments, the f network, the g network and the h network may be implemented as a simulation model or differential equation solver and their specific implementation modes are not restricted.

In a word, the whole neural network 10, which may be denoted by $F_{\omega,\theta,\varphi}$, uses the measurement values $x^{t-1}$ of the sensors at the point of time t−1, and the measurement values $x^{t-l:t-1}$ of the sensors and the state values $u^{t-l:t-1}$ of the triggers in the sliding window as inputs and uses the measurement values $\tilde{x}^{t-1}$ and $\tilde{x}^t$ of the sensors after the decoding of the hidden state vectors as outputs.

To train the model, it is necessary to obtain the data set in normal operating conditions of the dynamic control system where no anomaly occurs, and then use the gradient descent algorithm to solve the following problem. One example to which the gradient descent algorithm can be applied is adam (see Adam: *a method for stochastic optimization* published by Kingma, Diederik P & Jimmy Ba on the preprint platform arXiv: 1412.6980 in 2014).

$$\min_{\omega,\theta,\varphi} L = \sum_t \alpha \|x^{t-1} - \tilde{x}^{t-1}\|_2 + \beta \|x^t - \tilde{x}^t\|_2 + \gamma \|z^{t-1} - z^t\|_2$$

In the loss function above, the first two terms are respectively the reconstruction error and the prediction error of measurement values of the sensors, and the third term is a smoothing factor. In this way, continuous hidden state vectors at two points of time can be closer to each other. $\alpha$, $\beta$ and $\gamma$ are hyperparameters representing three weights.

After model training, the dynamic behaviors of the dynamic control system can be expressed as follows:

$$z^t = f_\theta(z^{t-1}; z^{t-l:t-1}, u^{t-l:t-1}) + Q$$

$$x^t = h_\varphi(z^t) + R$$

wherein Q is a covariance matrix of the prediction error and is obtained according to the estimation of the empirical value of the prediction error obtained from the formula below based on a validation data set:

$$g_\omega(x^t) - f_\theta(g_\omega(x^{t-1}); x^{t-l:t-1}, u^{t-l:t-1}), \text{ for all, } t < l$$

In the formula, R is a covariance matrix of the reconstruction error and is obtained according to the estimation of the reconstruction value obtained from the formula below based on the same validation data set:

$$x^t - h_\varphi(g_\omega(x^t)), \text{ for all } t$$

2. Bayes Filter for Anomaly Detection

Here, the Bayes filter can be used for anomaly detection and the time-varying probability distribution of the hidden state of the dynamic control system can be iteratively estimated.

Especially, $z^t$ and $P^t$ can be used to track the probability distribution of the hidden state of the dynamic control system (hereinafter referred to as "hidden state distribution"), wherein $z^t$ represents a mean vector and $P^t$ represents a covariance matrix of the hidden state distribution at the point of time t.

The whole process is divided into an initialization step, a prediction step, an updating step and an anomaly detection step.

i. Initialization Step

Let t=0 and initialize $z^0 = g_\omega(x^0)$ and $P^0 = 0$ (all elements are 0).

Then perform the following three steps (prediction, updating and anomaly detection) to iteratively estimate $z^t$ and $P^t$ and detect any anomaly.

ii. Prediction Step

In this step, calculate the prior mean and the covariance of the hidden state distribution at the point of time t. First, use a sampling function (for example, a sigma function) to generate a group of sampling points Z (called "first sampling points" here, and called sigma points if the sampling function is a sigma function) for the hidden state distribution at the point of time t−1. Sampling of the sigma function, for example, is described below. The corresponding weights of these sigma points are $W^m$ and $W^c$, wherein, one example of a sigma function is the use of the scaled sigma point algorithm presented by Van der Merwe (see *Sigma-Point Kalman Filters for Probabilistic Inference in Dynamic State-Space Models* published by Van der Merwe in 2004).

$$Z, W^m, W^c = \text{sigma function}(z^{t-1}, P^{t-1}) \qquad (1)$$

Select sigma points in such a way that only a small number of sigma points can represent the hidden state distribution of the dynamic control system at the point of time t−1. These sigma points can be input into the f network to perform a prediction to obtain at least one second sampling point (a sigma point in the example here) so that the formula below holds true:

$$Y = f_\theta(Z, x^{t-l:t-1}, u^{t-l:t-1}) \qquad (2)$$

In the formula, the mean and the covariance of the prior hidden state distribution can be obtained from the calculation of the unscented transformation function at the point of time t:

$$\bar{z}^t = \sum_i W_i^m Y_i \quad (3)$$

$$\bar{P}^t = \sum_i W_i^c (Y_i - \bar{z}^t)(Y_i - \bar{z}^t)^T + Q \quad (4)$$

iii. Updating Step

In this step, calculate the posterior mean and covariance (called $z^t$ and $P^t$) of the hidden state distribution of the dynamic control system at the point of time t. First, use the h network to map a prior sigma point Y of the hidden state distribution of the dynamic control system into a sensor measurement value space.

$$L = h(Y) \quad (5)$$

Use the unscented transformation function to perform calculations to obtain the mean and covariance of these measurement sigma points.

$$\mu = \sum_i W_i^m L_i \quad (5)$$

$$\Sigma = \sum_i W_i^c (L_i - \mu)(L_i - \mu)^T + R \quad (6)$$

Obtain a Kalman gain from the following formula:

$$K = \left[\sum_i W_i^c (Y_i - \bar{z}^t)(L_i - \mu)^T\right] \Sigma^{-1} \quad (8)$$

Then, perform the following updates:

$$Z^t = \bar{Z}^t + K(x^t - \mu) \quad (9)$$

$$P^t = \bar{P}^t - K \Sigma K^T \quad (10)$$

iv. Anomaly Detection Step

In this step, detect an anomaly by calculating the Mahalanobis distance between measurement values obtained from real-time monitoring and the predicted probability distribution:

$$\sqrt{(x^t - \mu)^T (\Sigma)^{-1} (x^t - \mu)} > \tau \quad (11)$$

When the Mahalanobis distance exceeds a preset threshold τ, the measurement values obtained from real-time monitoring will impossibly occur, even if the sensor noise of the predicted noise is considered. That is to say, an anomaly is detected.

3. Experiment

Using an example method of the present disclosure to detect an anomaly in a data set of a pump control system. System data consist of measurement values of 52 sensors sampled every minute in 5 months. The data set contains 7 faults lasting from hours to days. Here, the data set was divided into a training set, a validation set and a test set at ratios of 3:1:1. All the 7 faults happened in the period of the test set, which means that the training set and the validation set contain only data in the normal operating conditions. The training set is used to train the neural network and used the validation set to adjust the hyperparameters to obtain the optimal validation performance. The test set is used to evaluate the performance of the anomaly detection method.

FIG. 2 shows the performances of the anomaly detection method described herein and above-mentioned other anomaly detection methods (isolation forest, Bayes estimation algorithm, and auto-encoders including sparse auto-encoder, variational auto-encoder and LSTM auto-encoder). The same data set is used for training all baseline models.

Suppose that the maximum acceptable false positive rate (FPR) is 0.01 (one false alarm every 100 minutes) and compare some area under the receiver operating characteristic (ROC) curve (AUC) values when the maximum FPR is 0.01. The larger the AUC value is, the more anomalies are detected by the model when the FPR is the same. As shown in FIG. 2, the method provided by embodiments of the present invention is obviously superior to other methods, wherein No. 1 corresponds to the method provided by embodiments of the present invention, No. 2 corresponds to the isolation forest, No. 3 corresponds to the Seq2SeqLSTM, No. 4 corresponds to the dilated convolution neural network (dilated CNN), No. 5 corresponds to the sparse auto-encoder, No. 6 corresponds to the variational auto-encoder, No. 7 corresponds to the LSTM auto-encoder, and No. 8 corresponds to the Bayes estimation algorithm.

Figure 3:
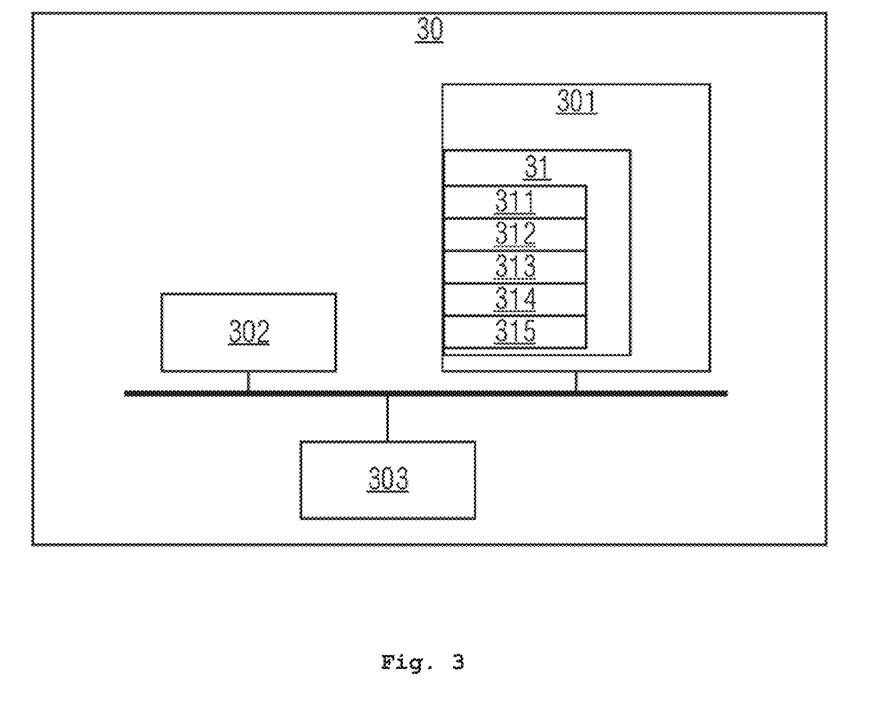
FIG. 3 shows the structure of an example anomaly detection apparatus incorporating teachings of the present disclosure.

System identification of the dynamic control system and the principle of anomaly detection of the Bayes filter are described above. The apparatus 30 provided by various embodiments of the present disclosure to realize anomaly detections are described below.

The anomaly detection apparatus 30 incorporating teachings of the present disclosure may be implemented as a network of computer processors to realize the anomaly detection method 400 for a dynamic control system as described herein. The anomaly detection apparatus 30 may also be a single computer shown in FIG. 3, comprising at least one memory 301, including a computer-readable medium (RAM). The apparatus 30 further comprises at least one processor 302 coupled with at least one memory 301. Computer-executable instructions are stored in at least one memory 301, and allow at least one processor 302 to perform the steps described in this document when executed by at least one processor 302. At least one processor 302 may be a microprocessor, an application-specific integrated circuit (ASIC), a digital signal processor (DSP), a central processing unit (CPU), a graphics processing unit (GPU) or a state machine. Embodiments of the computer-readable medium include, but are not limited to, floppy disks, CD-ROM, disks, memory chips, ROMs, RAMS, ASICs, configured processors, all-optical media, all magnetic tapes or other magnetic media, and any other medium from which a computer processor can read instructions. In addition, computer-readable media in other forms, which can send or carry instructions to a computer, include routers, private or public networks, or other wired and wireless transmission equipment or channels. Instructions may include codes in any computer programming language, including C, C++, C language, Visual Basic, Java and JavaScript.

When the anomaly detection method is executed by at least one processor 302, the at least one memory 301 shown in FIG. 3 may contain an anomaly detection program 31 for a dynamic control system to allow at least one processor 302 to execute the anomaly detection method 400 for a dynamic control system provided by various embodiments of the present disclosure. The anomaly detection program 31 for a dynamic control system may comprise:

an initialization module 311, configured to use a g network of the neural network 10 shown in FIG. 1 to initialize a hidden state distribution of a dynamic control system;

a data acquisition module 312, configured to receive a measurement value of a sensor and a state value of a trigger obtained from real-time monitoring in the dynamic control system at the current point of time t;

a prediction module 313, configured to input at least one first sampling point into an f network of the neural network 10 to perform a prediction to obtain at least one second sampling point, wherein the at least one first sampling point is used to represent a hidden state distribution of the dynamic control system at a neighboring point of time t−1 before the current point of time t, the at least one second sampling point is used to represent a prior hidden state distribution of the dynamic control system at the current point of time t, and use an h network of the neural network 10 to map the at least one second sampling point into a sensor measurement value space to perform a prediction to obtain a probability distribution of a measurement value of the sensor in the dynamic control system at the current point of time t;

an anomaly determination module 314, configured to determine whether an anomaly exists in the dynamic control system by comparing the measurement value obtained from real-time monitoring and the probability distribution obtained from a prediction.

In some embodiments, the anomaly detection program 31 may further comprise an updating module 315, configured to update the posterior hidden state distribution of the dynamic control system at the current point of time t to obtain the first sampling point at a neighboring point of time t+1 after the current point of time t.

In some embodiments, the loss function adopted for training the neural network minimizes the sum of the reconstruction error and the prediction error of measurement values of a sensor used for training at different points of time.

In some embodiments, the at least one first sampling point and the at least one second sampling point are both sigma sampling points.

In some embodiments, the anomaly detection apparatus 30 may further comprise a communication module 303, and the communication module is connected with at least one processor 302 and at least one memory 301 via a bus and is used for communication of the anomaly detection apparatus 30 with external equipment.

It should be noted that embodiments of the present disclosure may comprise apparatuses whose structures are different from what is shown in FIG. 3. The above-mentioned structure is only exemplary and is used to explain the method 400 provided by embodiments of the present disclosure.

In some embodiments, the above-mentioned modules can also be considered as functional modules realized by hardware and are used to realize the functions involved when the image stitching apparatus 30 executes the image stitching method. For example, the control logics of various processes involved in the image stitching method are burned into field-programmable gate array (FPGA) chips or complex programmable logic devices (CPLDs) in advance, and then these chips or devices execute the functions of the above-mentioned modules. The particular realization mode depends on the engineering practice.

In some embodiments, the anomaly detection apparatus 30 may further comprise a communication module 303, and the communication module is connected with at least one processor 302 and at least one memory 301 via a bus and is used for communication of the anomaly detection apparatus 30 with external equipment.

Figure 4:
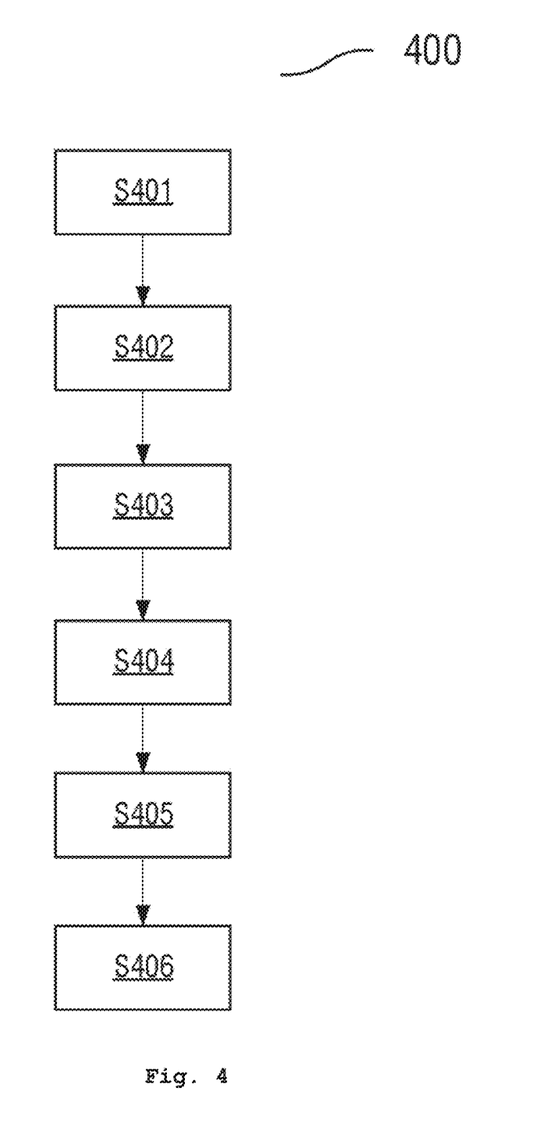
FIG. 4 is a flowchart showing an example anomaly detection method incorporating teachings of the present disclosure.

The anomaly detection method 400 for a dynamic control system provided by teachings of the present disclosure is described in combination with FIG. 4. As shown in FIG. 4, the method may comprise:

S401: using a g network of the neural network 10 shown in FIG. 1 to initialize a hidden state distribution of a dynamic control system;

S402: receiving a measurement value of a sensor and a state value of a trigger obtained from real-time monitoring in the dynamic control system at the current point of time t;

S403: inputting at least one first sampling point into an f network of the neural network 10 to perform a prediction to obtain at least one second sampling point, wherein the at least one first sampling point is used to represent a hidden state distribution of the dynamic control system at a neighboring point of time t−1 before the current point of time t, and the at least one second sampling point is used to represent a prior hidden state distribution of the dynamic control system at the current point of time t;

S404: using an h network of the neural network 10 to map at least one second sampling point into a sensor measurement value space to perform a prediction to obtain a probability distribution of a measurement value of the sensor in the dynamic control system at the current point of time t;

S405: determining whether an anomaly exists in the dynamic control system by comparing the measurement value obtained from real-time monitoring and the probability distribution obtained from a prediction.

In some embodiments, the method 400 may further comprise step S406: updating the posterior hidden state distribution of the dynamic control system at the current point of time t to obtain the first sampling point at a neighboring point of time t+1 after the current point of time t.

In some embodiments, the loss function adopted for training the neural network 10 minimizes the sum of the reconstruction error and the prediction error of measurement values of a sensor used for training at different points of time.

In some embodiments, at least one first sampling point and at least one second sampling point are both sigma sampling points.

In addition, embodiments of the present disclosure further provide a computer-readable medium. Computer-readable instructions are stored in the computer-readable medium and a processor executes the above-mentioned anomaly detection method for a dynamic control system when the computer-readable instructions are executed by the processor. Embodiments of the computer-readable medium include a floppy disk, a hard disk, a magneto-optical disk, a compact disk (for example, CD-ROM, CD-R, CD-RW, DVD-ROM, DVD-RAM, DVD-RW, DVD+RW), a magnetic tape, a non-volatile memory card, and a ROM. In some embodiments, computer-readable instructions can be downloaded from a server computer or cloud via a communication network.

It should be noted that not all steps in the above-mentioned flowcharts or modules in system structure diagrams are required, and some steps or modules may be omitted, depending on the actual requirements. The execution sequence of the steps is not fixed and may be adjusted as required. The system structures described in the above-mentioned embodiments may be physical structures or logical structures. That is to say, some modules may be realized by a physical entity, or some modules may be realized by a plurality of physical entities or may jointly be realized by some components in a plurality of self-contained devices.

What is claimed is:

1. An anomaly detection method for a dynamic control system, the method comprising:
   using a g network to initialize a hidden state distribution of a dynamic control system;
   receiving a measurement value of a sensor and a state value of a trigger obtained from real-time monitoring in the dynamic control system at a current point of time;
   receiving at least one first sampling point into an f network to perform a prediction to obtain at least one second sampling point, wherein the at least one first sampling point is used to represent a hidden state distribution of the dynamic control system at a neighboring point of time before the current point of time, and the at least one second sampling point is used to represent a prior hidden state distribution of the dynamic control system at the current point of time;
   using an h network to map the at least one second sampling point into a sensor measurement value space to perform a prediction to obtain a probability distribution of a measurement value of the sensor in the dynamic control system at the current point of time;
   determining whether an anomaly exists in the dynamic control system by comparing the measurement value obtained from real-time monitoring and the probability distribution obtained from a prediction;
   wherein the g network, the f network, and the h network are sub-networks in a neural network used to represent a dynamic distribution of the dynamic control system, the g network is a feed-forward network and encodes a measurement value of a sensor into a low-dimensionality hidden state vector;
   the f network encodes a measurement value of a sensor and a state value of a trigger in a sliding window into vectors and utilizes the hidden state vector obtained from encoding of the g network at the current point of time to predict a hidden state vector at a next point of time;
   the h network Is a feed-forward network and decodes the hidden state vector obtained from the prediction at the next point of time into a measurement value of a sensor and decodes the low-dimensionality hidden state vector at the current point of time into a measurement value of a sensor; and
   the neural network is obtained by using measurement values of a sensor obtained in normal operating conditions of the dynamic control system to perform training.

2. The method as claimed in claim 1, the method further comprising updating the posterior hidden state distribution of the dynamic control system at the current point of time to obtain the first sampling point at a neighboring point of time after the current point of time.

3. The method as claimed in claim 1, wherein a loss function is adopted for training the neural network so that a sum of a reconstruction error and a prediction error of measurement values of the sensor at different points of time used for training is a minimum.

4. The method as claimed in claim 1, wherein the at least one first sampling point and the at least one second sampling point are both sigma sampling points.

5. An anomaly detection apparatus for a dynamic control system, the apparatus comprising:
   an initialization module comprising a first processor configured to use a g network to initialize a hidden state distribution of a dynamic control system;
   a data acquisition module comprising a second processor configured to receive a measurement value of a sensor and a state value of a trigger obtained from real-time monitoring in the dynamic control system at the current point of time;
   a prediction module comprising a third processor configured to:
     input at least one first sampling point into an f network to perform a prediction to obtain at least one second sampling point, wherein the at least one first sampling point is used to represent a hidden state distribution of the dynamic control system at a neighboring point of time before the current point of time, and the at least one second sampling point is used to represent a prior hidden state distribution of the dynamic control system at the current point of time; and
     use an h network to map the at least one second sampling point into a sensor measurement value space to perform a prediction to obtain a probability distribution of a measurement value of the sensor in the dynamic control system at the current point of time; and
   an anomaly determination module comprising a fourth processor configured to determine whether an anomaly exists in the dynamic control system by comparing the measurement value obtained from real-time monitoring and the probability distribution obtained from a prediction;
   wherein the g network, the f network, and the h network are sub-networks in a neural network used to represent the dynamic distribution of the dynamic control system, the g network is a feed-forward network and encodes a measurement value of a sensor into a low-dimensionality hidden state vector;
   the f network encodes a measurement value of a sensor and a state value of a trigger in a sliding window into vectors and utilizes the hidden state vector obtained from the encoding of the g network at the current point of time to predict a hidden state vector at the next point of time;
   the h network is a feed-forward network and decodes the hidden state vector obtained from the prediction at the next point of time into a measurement value of a sensor and decodes the low-dimensionality hidden state vector at the current point of time into a measurement value of a sensor; and
   the neural network is obtained by using measurement values of a sensor obtained in normal operating conditions of the dynamic control system to perform training.

6. The apparatus as claimed in claim 5, the apparatus further comprising an updating module configured to update the posterior hidden state distribution of the dynamic control system at the current point of time to obtain the first sampling point at a neighboring point of time after the current point of time.

7. The apparatus as claimed in claim 5, wherein the loss function adopted for training the neural network minimizes the sum of the reconstruction error and the prediction error of measurement values of a sensor used for training at different points of time.

8. The apparatus as claimed in claim 5, wherein the at least one first sampling point and the at least one second sampling point both comprise sigma sampling points.

9. An anomaly detection apparatus for a dynamic control system, the apparatus comprising:
- a memory configured to store computer-readable codes;
- a processor configured to cause the computer-readable codes to:
- use a g network to initialize a hidden state distribution of a dynamic control system;
- receive a measurement value of a sensor and a state value of a trigger obtained from real-time monitoring in the dynamic control system at a current point of time;
- receive at least one first sampling point into an f network to perform a prediction to obtain at least one second sampling point, wherein the at least one first sampling point is used to represent a hidden state distribution of the dynamic control system at a neighboring point of time before the current point of time, and the at least one second sampling point is used to represent a prior hidden state distribution of the dynamic control system at the current point of time;
- use an h network to map the at least one second sampling point into a sensor measurement value space to perform a prediction to obtain a probability distribution of a measurement value of the sensor in the dynamic control system at the current point of time;
- determine whether an anomaly exists in the dynamic control system by comparing the measurement value obtained from real-time monitoring and the probability distribution obtained from a prediction;
- wherein the g network, the f network, and the h network are sub-networks in a neural network used to represent a dynamic distribution of the dynamic control system, the g network is a feed-forward network and encodes a measurement value of a sensor into a low-dimensionality hidden state vector;
- the f network encodes a measurement value of a sensor and a state value of a trigger in a sliding window into vectors and utilizes the hidden state vector obtained from encoding of the g network at the current point of time to predict a hidden state vector at a next point of time;
- the h network Is a feed-forward network and decodes the hidden state vector obtained from the prediction at the next point of time into a measurement value of a sensor and decodes the low-dimensionality hidden state vector at the current point of time into a measurement value of a sensor; and
- the neural network is obtained by using measurement values of a sensor obtained in normal operating conditions of the dynamic control system to perform training.

\* \* \* \* \*